United States Patent
Don et al.

(10) Patent No.: US 10,684,782 B2
(45) Date of Patent: Jun. 16, 2020

(54) DATA PROTECTION DECISION BASED ON DEVICE USAGE

(71) Applicant: EMC IP Holding Company LLC, Hopkinton, MA (US)

(72) Inventors: Arieh Don, Newton, MA (US); Jehuda Shemer, Kfar Saba (IL); Yaron Dar, Sudbury, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 177 days.

(21) Appl. No.: 16/053,629

(22) Filed: Aug. 2, 2018

(65) Prior Publication Data

US 2020/0042198 A1 Feb. 6, 2020

(51) Int. Cl.
*G06F 12/00* (2006.01)
*G06F 3/06* (2006.01)
*G06F 11/14* (2006.01)

(52) U.S. Cl.
CPC ............ *G06F 3/0619* (2013.01); *G06F 3/065* (2013.01); *G06F 3/067* (2013.01); *G06F 11/1446* (2013.01)

(58) Field of Classification Search
CPC ........ G06F 3/0619; G06F 3/065; G06F 3/067; G06F 11/1446
See application file for complete search history.

(56) References Cited

U.S. PATENT DOCUMENTS

2016/0292250 A1* 10/2016 Chen .................... G06F 11/2097
2017/0235509 A1* 8/2017 Chittenden ........... G06F 3/0622
711/163

* cited by examiner

*Primary Examiner* — Shawn X Gu
(74) *Attorney, Agent, or Firm* — Workman Nydegger (57) ABSTRACT

One example method includes receiving an IO associated with a process initiated by an application, where the IO is identified by a tag that corresponds to the process. The method further includes saving the tag on a device that is an element of a storage group (SG) that is specific to the application, and correlating the tag with a data protection process that is associated with the application. When a request is received to perform an SG protection process, the SG protection process is performed on the tagged device.

20 Claims, 5 Drawing Sheets

| IO | PROCESS NAME TAG | PROTECTION | APPLICATION NAME | DEVICE USAGE | PRIORITY |
|---|---|---|---|---|---|
| DATASTORE | 1 | SNAPSHOT + CLONE | ORACLE | DATABASE | L |
| INDEX | 2 | NONE | ORACLE | INDEX | L |
| LOG | 3 | CLONE | ORACLE | LOG | H |
| OTHER | 'n' | SNAP; CLONE; COMPR; DEDUPE | ANY | ANY | H |

FIG. 1

| IO | PROCESS NAME TAG | PROTECTION | APPLICATION NAME | DEVICE USAGE | PRIORITY |
|---|---|---|---|---|---|
| DATASTORE | 1 | SNAPSHOT + CLONE | ORACLE | DATABASE | L |
| INDEX | 2 | NONE | ORACLE | INDEX | L |
| LOG | 3 | CLONE | ORACLE | LOG | H |
| OTHER | 'n' | SNAP; CLONE; COMPR; DEDUPE | ANY | ANY | H |

DATA PROTECTION DECISION BASED ON DEVICE USAGE

FIELD OF THE INVENTION

Embodiments of the present invention generally relate to data protection. More particularly, at least some embodiments of the invention relate to systems, hardware, software, computer-readable media, and methods directed to various processes for automatically identifying and marking all devices within a given storage group that require replication and/or some other type of data protection. The automatic identification and marking of devices is enabled by the use of IO tagging.

BACKGROUND

The operation of applications, such as database (DB) applications for example, may involve multiple different device types. Thus, in the example case of a DB application, data devices, log devices, index devices, and other devices, may be employed in connection with the operation of the application. In order to prevent against data loss, natural disasters, and other problems, many enterprises choose to replicate, or otherwise protect, the application and associated devices. Replicating or otherwise protecting the application, data generated by the application, and associated devices, such as by way of remote relocation or snapshots for example, typically requires that the data devices, but not the logs or index devices, be replicated/sent-remotely.

Typically, the user is required to specify which devices to replicate, and also to specify which devices do not require replication. In some cases, the user can do this by placing the devices in different respective storage groups (SG), that is, devices to be replicated are placed in one storage group, while devices that will not be replicated are put in a different storage group. To illustrate, a user may decide that a data device SG will be replicated but a log/index SG will not. One consequence of this approach is that a single application will have, or be associated with, multiple different SGs. Since the application devices are spread out over multiple SGs, management of the application devices may be complex and difficult.

The user can avoid the multiple SG problem by placing all of the devices in a single SG. However, this approach presents problems of its own. For example, because all the devices are in a single SG, the user must specify, on a per-device basis, how each device will be handled. This is typically performed manually, that is, the user must manually mark the devices that are to be excluded from replication. Because SGs can be quite large, a single SG may include as many as 50K-60K devices, this manual approach is not practical in many cases.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to data protection. More particularly, at least some embodiments of the invention relate to systems, hardware, software, computer-readable media, and methods directed to various processes for automatically identifying and marking all devices within a given storage group that require replication and/or some other type of data protection.

In general, the automatic identification and marking of devices is performed in connection with input and output operations initiated by an application and involving those devices, such as read and write operations, for example. These input and output operations may be referred to herein collectively as IOs. More specifically, the marking of devices in an SG for replication, or other, purposes is enabled by the use of input/output operation (IO) tagging. Tagging based on IO processes involves the use of a multi-path input/output (MPIO) layer, which may be referred to herein simply as an MPIO, to detect the name of the process which created a particular IO. As used herein, MPIO refers to a technique, and associated components, that handle data storage, and retrieval of stored data, from various storage devices using multiple paths, based on IO requests from an application. Thus, the MPIO may be implemented in the form of an MPIO module that includes computer-executable instructions on a non-transitory storage medium for performing any of the MPIO operations disclosed herein.

In operation, the MPIO receives an IO operation from an application, such as Oracle® for example, and the MPIO detects the name of the process that generated the IO operation. The process may concern, for example, data stored in a storage array, and the MPIO can then tag the associated IOs with that process tag. Correspondingly, a storage array can associate that process tag with the device, or devices, to which the IOs are directed. In this way, the devices of the storage array are directly correlated with the IOs of a host application.

This correlation may be implemented, for example, by the use of a table which may be located in the storage array. More particularly, the table maps the tags to a set of behaviors associated with the corresponding devices. To illustrate, an example table entry may indicate to a remote replication system or application that the database device should be cloned and/or a snapshot taken of the database. Thus, when a protection process is initiated with respect to a particular application, the storage array is aware of how each device in the SG associated with that application should be handled, and the storage array then performs the indicated process, or processes, for each device, for example, by cloning an Oracle® database device.

Advantageously then, embodiments of the invention may provide various benefits relative to conventional systems and methods. To illustrate, embodiments of the invention may enable a user to readily place all the devices associated with an application in a single SG. Consequently, management of the application devices is relatively easier and less complex than if the devices were spread over multiple SGs. As well, embodiments of the invention may automatically designate the type of replication protection needed for each device. Thus, a user need not manually designate how each device should be handled by a replication application. Further, embodiments of the invention may read the per-device information included in the storage array and then replicate, or not, the devices in the SG according to the per-device information. In this way, replication decisions for devices are automatically made based upon usage of the devices in connection with the operation of a particular application. Finally, embodiments of the invention enable protection of storage array devices on a per-application basis.

As the foregoing examples illustrate, embodiments of the invention may improve the operation of a computing system, or element of a computing system, such as by facilitating improvements in the speed and efficiency with which application devices are replicated by a remote replication application and/or replication system. Further, embodiments of the invention improve the operation of a computing system, or element of a computing system, by leveraging information about IO tagging to automatically mark devices that require replication of some type. Aspects of the disclosed processes and methods are discussed below in connection with various illustrative examples.

A. Aspects of An Example Operating Environment

The following is a discussion of aspects of example operating environments for various embodiments of the invention. This discussion is not intended to limit the scope of the invention, or the applicability of the embodiments, in any way.

In general, embodiments of the invention may include and/or be implemented in an operating environment that includes a storage environment, which may include one or more storage systems including primary storage and data protection storage. More particularly, example embodiments of the invention may be implemented in a storage environment that comprises, or consists of, a storage area network (SAN) with a storage array. The SAN may be configured for communication with one or more host devices.

In some specific example embodiments of the invention, at least some data protection functionality, such as replication for example, may be provided by, or implemented in connection with, a platform such as the Dell-EMC RecoverPoint application which, in general, is configured to perform local and remote replication of one or more devices of an SG. Use of the RecoverPoint platform is presented only by way of example, and is not required. More generally, any other suitable replication application may alternatively be used. Example data protection processes are not necessarily limited to replication processes, but rather are intended to be broad in scope and include, but are not limited to, partial backups, incremental backups, full backups, clones, snapshots, continuous replication, and any other type of copies of data, and any combination of the foregoing. Any of the foregoing may, or may not, be deduplicated.

The storage environment may take the form of a cloud storage environment, an on-premises storage environment, and hybrid storage environments that include public and private elements, although the scope of the invention extends to any other type of data protection environment as well. Any of these example storage environments, may be partly, or completely, virtualized. The storage environment may comprise, or consist of, a datacenter which is operable to service read and write operations initiated by one or more clients.

In addition to the storage environment, the operating environment may also include one or more host devices, such as clients for example, that each host one or more applications. As such, a particular client may employ, or otherwise be associated with, one or more instances of each of one or more applications. In general, the applications employed by the clients are not limited to any particular functionality or type of functionality. Some example applications and data include email applications such as MS Exchange, filesystems, as well as databases such as Oracle databases, and SQL Server databases, for example. The applications on the clients may generate new and/or modified data that is desired to be protected.

Any of the devices, including the clients, servers and hosts, in the operating environment can take the form of software, physical machines, or virtual machines (VM), or any combination of these, though no particular device implementation or configuration is required for any embodiment. Similarly, data protection system components such as databases, storage servers, storage volumes, storage disks, replication services, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, and any group of one or more of the foregoing.

Example embodiments of the invention are applicable to any system capable of storing and handling various types of objects, in analog, digital, or other form. Although terms such as document, file, block, or object may be used by way of example, the principles of the disclosure are not limited to any particular form of representing and storing data or other information. Rather, such principles are equally applicable to any object capable of representing information.

Figure 1:
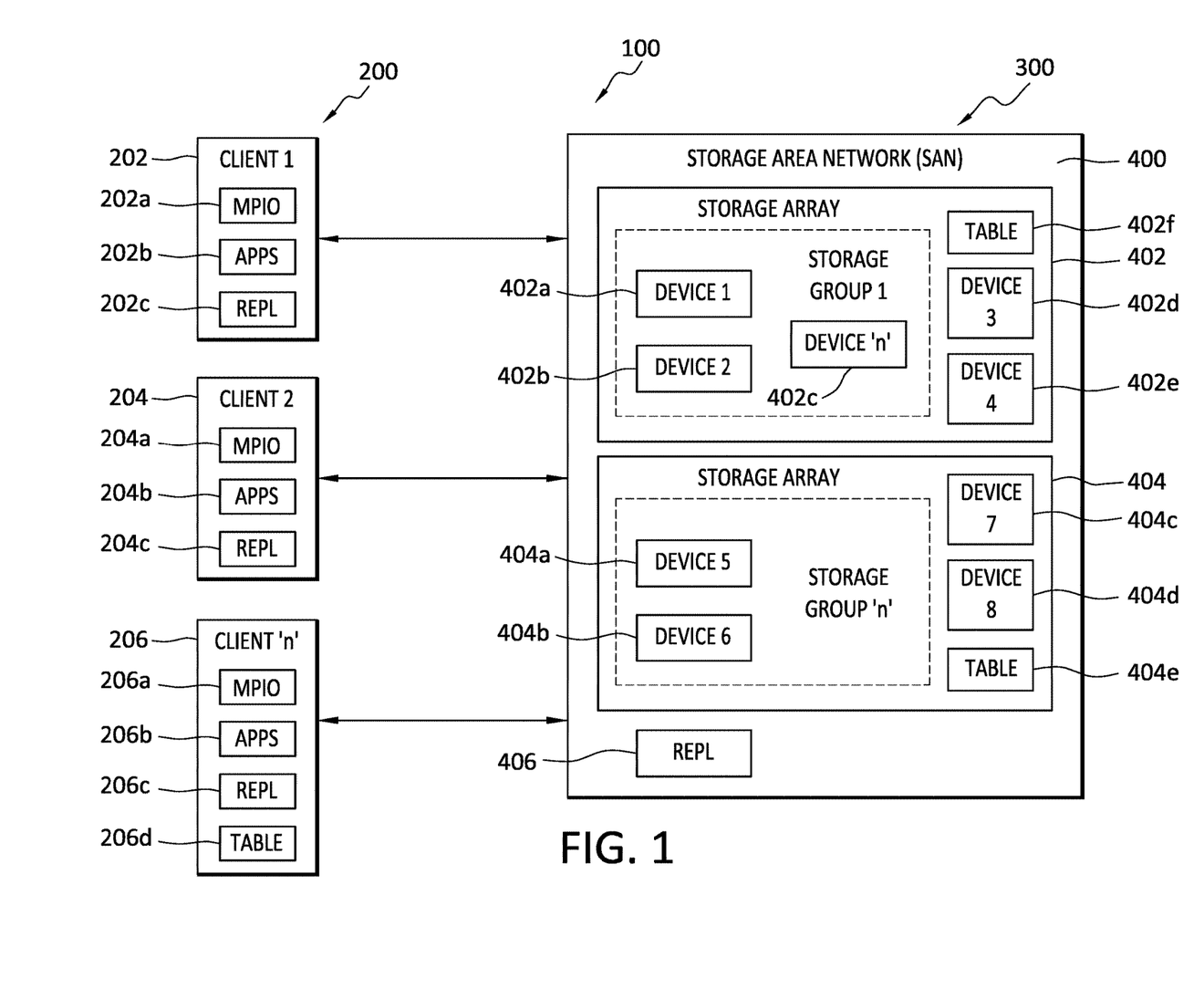
FIG. 1 discloses aspects of an example operating environment for some embodiments of the invention.

With particular reference now to FIG. 1, an example operating environment 100 may include a plurality of clients 200, such as clients 202, 204 and 206. Each of the clients 200 may include a respective MPIO 202a, 204a and 206a, and the clients 200 may also host one or more applications 202b, 204b and 206b respectively, that create new and/or modified data that is desired to be protected. As well, each of the clients 200 may also host an instance of a replication application 202c, 204c, and 206c, respectively. The replication application instances 202c, 204c, and 206c, may, in general, cooperate with the applications 202b, 204b and 206b to initiate replication processes with respect to storage environment assets, discussed below, employed by the applications 202b, 204b and 206b. Finally, as exemplified by client 206, one or more of the clients 200 may include a table, such as table 206d for example, that maps process tags (discussed below) to a set of behaviors, or replication processes, associated with corresponding data devices (discussed below).

The clients 200 are examples of host devices. One, some, or all, of the clients 200 may take the form of a VM, although that is not required. In general, the VM is a virtualization of underlying hardware and/or software and, as such, one or more of the clients 200 may include or otherwise be associated with various underlying components.

With continued reference to FIG. 1, the example operating environment 100 may further include a storage environment 300. The storage environment 300 may comprise, or consist of, one or more SANs 400. The SAN 400 may comprise one or more storage arrays 402 and 404. While the following discussion is primarily concerned with storage array 402, that discussion is equally applicable to storage array 404.

In general, the storage array 402 can employ, or be backed by, a mix of storage types, such as Solid State Drive (SSD) storage for transactional type workloads such as databases and boot volumes whose performance is typically considered in terms of the number of input/output operations (IOPS) performed. Additionally, or alternatively, the storage array 402 can use Hard Disk Drive (HDD) storage for throughput intensive workloads that are typically measured in terms of data transfer rates such as MB/s.

The storage array 402 may include various devices 402*a*, 402*b*, 402*c*, 402*d*, and 402*e*. Such devices 402*a*, 402*b*, 402*c*, 402*d*, and 402*e* may comprise any type, number, and combination of devices that store data that is desired to be protected in some way. Thus, such devices 402*a*, 402*b*, 402*c*, 402*d*, and 402*e* may comprise, for example, log devices, database devices, index devices, or any other device including and/or relating to the storage of data in the storage array. Accordingly, devices such as devices 402*a*, 402*b*, 402*c*, 402*d*, and 402*e* may be generally referred to as data devices. Storage array 402 may include any number and type of data devices. Any one or more of these data devices may be involved in the processing of IOs by applications 202*b*, 204*b* and/or 206*b*. Thus, a storage group (SG), such as Storage Group 1 which includes devices 402*a*, 402*b* and 402*c*, may be defined, such as by a user, that includes one or more of the data devices of the storage array 402.

As indicated in FIG. 1, not all of the data devices in the storage array 402 are necessarily included in an SG. Thus, devices 402*d* and 402*e* are not part of Storage Group 1. Rather, the particular grouping of data devices embraced by an SG may vary from one application to another. As such, a data device may be an element of multiple different SGs at the same time. Moreover, an SG may be modified by adding or removing data devices to/from that SG. In some instances, such as when an application is no longer hosted by a client 200, the SG corresponding to that application may be deleted, although the data devices embraced by that SG can remain as part of the storage array 402.

In addition to various data devices, the storage array 402 may include a table 402*f* that maps IO process tags to a set of behaviors, or replication processes, associated with corresponding data devices. As noted in the discussion of the clients 200, such a table may alternatively reside at one or more of the clients 202, 204 and/or 206. One example implementation of a table is discussed below in connection with FIG. 2.

With continued reference to FIG. 1, the storage array 404 may be similar, or identical, to the storage array 402. The example storage array 404 includes various devices 404*a*, 404*b*, 404*c*, and 404*d*. As well, a table 404*e* may be included as part of the storage array 404. In connection with the storage array 404, an SG 'n' may be defined that embraces device 404*a* and device 404*b*. In this case, devices 404*c* and 404*d* are not part of the SG 'n.'

Finally, in some embodiments, one or more instances of a remote replication application 406 may be an element of the SAN 400, rather than residing at one or more of the clients 200. However, the scope of the invention is not limited to any particular arrangement or configuration.

B. Aspects of An Example Table

Figure 2:
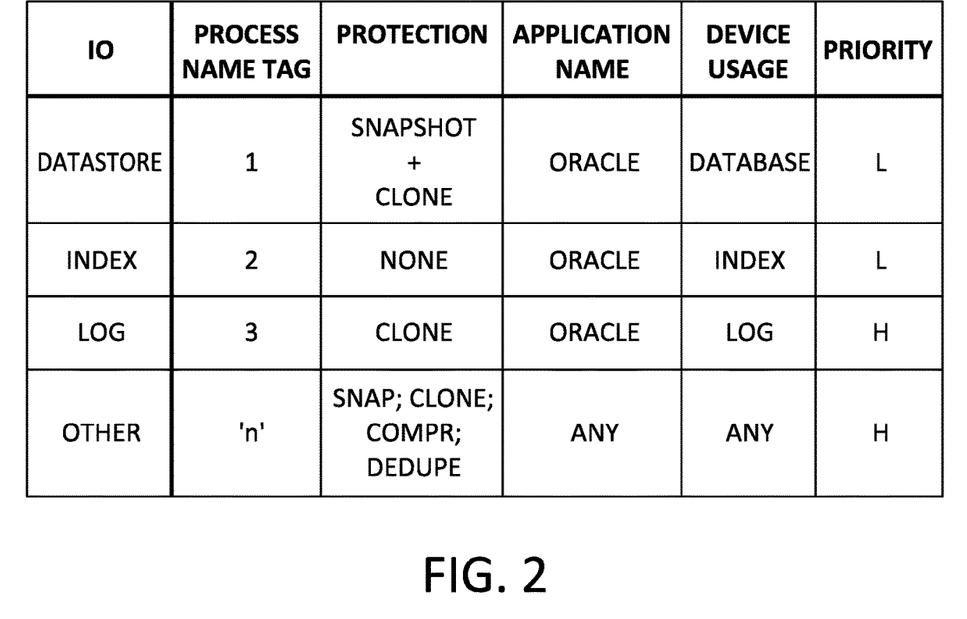
FIG. 2 discloses aspects of an example table structure that may be employed by a host device and/or a storage array.

With continued attention to FIG. 1, and directing attention now to FIG. 2 as well, details are provided concerning tables, one example of which is denoted generally at 500 in FIG. 2. In some embodiments, the MPIO may create and maintain the table 500, but that is not required, and another entity, such as the storage array or one of its components, may create and maintain the table 500. In general, the example table 500 provides a mapping among: (i) an application that initiates a process involving the storage array; (ii) an IO associated with an application process; (iii) a device to which the IO is directed; (iv) a tag that is applied to the IO; (v) a type of protection to be applied to a device; and, (vi) a relative priority of a particular protection process.

The table 500 may be specific to a particular SG and the table 500 may be updated when the constituents of the SG are modified. If an SG is deleted, the corresponding table may also be deleted. As well, the table 500 may be read by any one or more of, an application running at a client, an MPIO, and/or a storage array.

In the first column of the table 500, there is a listing of various IOs associated with application processes. For example, a datastore device such as a database will get IOs from a datastore process, such as an application read or write process. As another example, a log device or index device will get IOs from a log/index process involved with the operation of an application. Thus, the IOs may originate from any of a variety of different processes performed by, and/or at the direction of, an application. These applications, such as Oracle®, are also listed in the mapping provided by the table 500. Correspondingly, these IOs will be directed to various devices of a storage array for handling.

As further indicated, the table 500 may also include a second column with various tags that can be used to identify the nature of an IO originating from an application process. Thus, an IO may be tagged, for example, with a number, such as a number 1-15, where each number signifies a particular type of device. In the illustrated example, the tags are 1, 2, 3 and 'n.' These numbers may be passed in the IO Command Descriptor Block (CDB) indicating whether a device is a Log device, DB device, or other device. More particularly, one byte of the CDB is devoted to a 'group number' that is used for the tag. Because the MPIO is able to detect the name of the process which created the IO, the MPIO can apply the appropriate tag(s) to the IO.

The table 500 also identifies the device, or devices, to which an IO is directed. Examples of such devices include a database device, an index device, and a log device. Additional, or alternative, devices may be listed in the table.

The example table 500 may also list the particular type of protection to be applied to a device within a defined SG. Such protection types may include, for example, snapshot, clone, compress, deduplicate, or any other type of data protection process. As shown in the table 500, some devices may be subject to multiple types of protection, while other devices may not be protected at all.

Finally, the table 500 may indicate a relative priority for performance of the indicated protection processes. To illustrate, creating a snapshot and clone of a database may be relatively lower priority 'L' than cloning a log, which may have a relatively higher priority 'H.' The priorities may come into play where, for example, processing resources at the storage array and/or time available for performance of the protection processes are constrained in some way.

C. Example Host and Server Configurations

Figure 3:
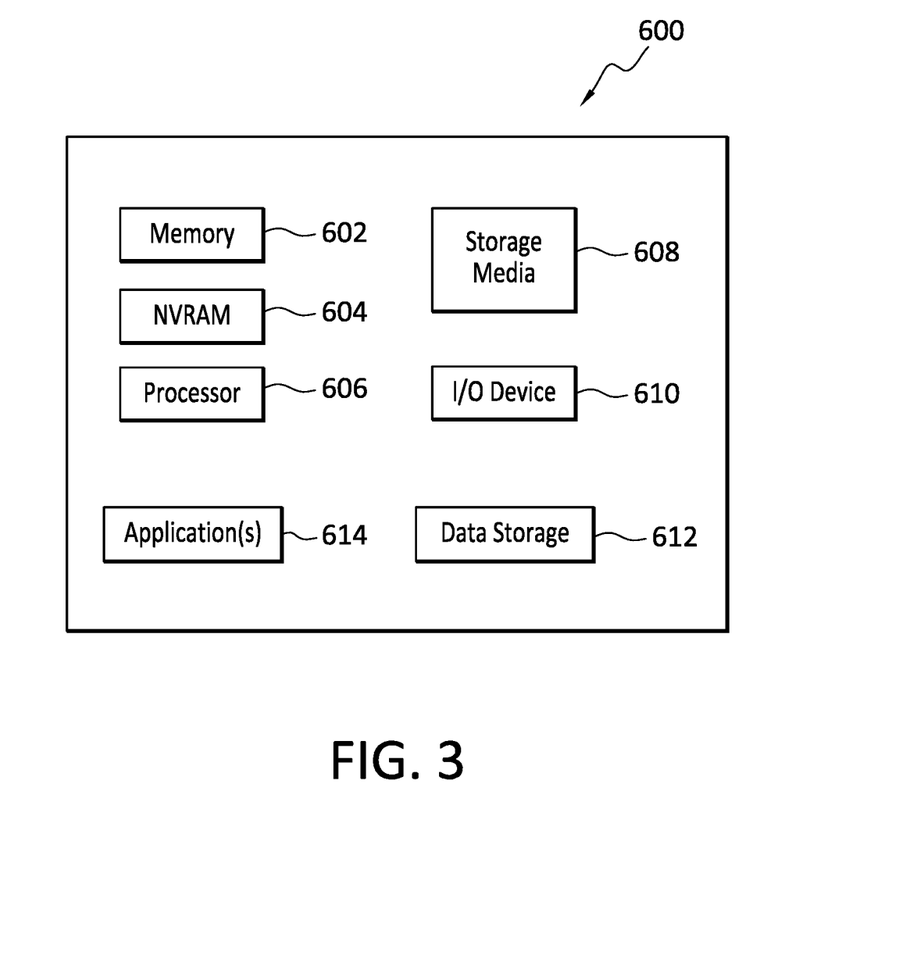
FIG. 3 discloses aspects of an example host configuration.

With reference briefly now to FIG. 3, any one or more of the clients 200 and its components, storage environment 300 and its components, SAN 400 and its components, storage arrays 402 and 404, storage group 1, storage group 'n,' devices 402a . . . 402d, and devices 404a . . . 404d, can take the form of a physical computing device, one example of which is denoted at 600. As well, where any of the aforementioned elements comprise or consist of a VM, that VM may constitute a virtualization of any combination of the physical components disclosed in FIG. 3.

In the example of FIG. 3, the physical computing device 600 includes a memory 602 which can include one, some, or all, of random access memory (RAM), non-volatile random access memory (NVRAM) 604, read-only memory (ROM), and persistent memory, one or more hardware processors 606, non-transitory storage media 608, IO device 610, and data storage 612. One or more of the memory components 602 of the physical computing device can take the form of solid state device (SSD) storage. As well, one or more applications 614 are provided that comprise executable instructions. Such executable instructions can take various forms including, for example, executable instructions for performing any combination of one or more of the following processes: initiating and performing a replication process; cloning a device and/or its data; taking a snapshot of a device and/or its data; compressing data; deduplicating data; tagging an IO associated with the performance of an application process; creating/storing/modifying/deleting a table; mapping elements of a table; creating/modifying/deleting an SG; creating/modifying/deleting data; and, reading/using the protection processes associated with a device.

D. Functional Overview

Figure 4:
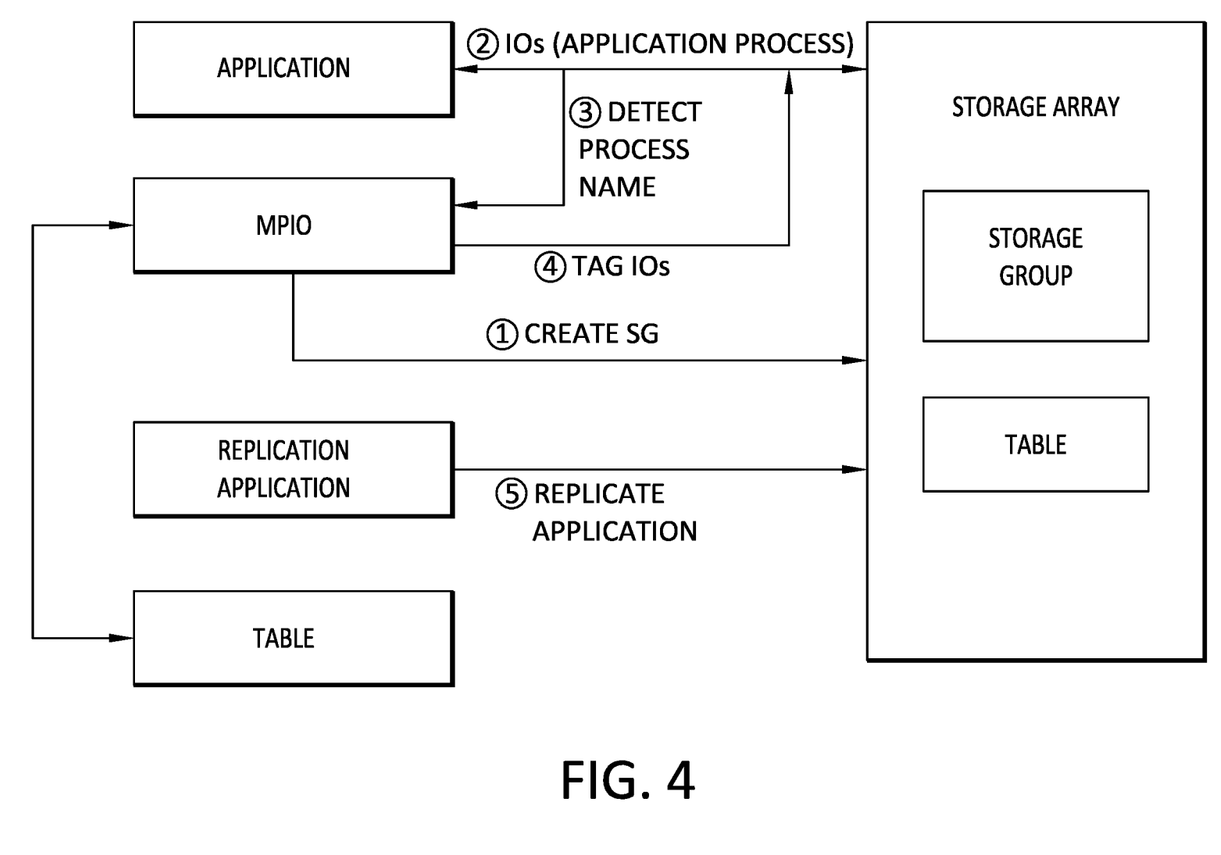
FIG. 4 is a functional diagram that discloses aspects of processes in accordance with various embodiments of the invention.

Turning now to FIG. 4, details are provided concerning a functional diagram that discloses various operations and devices associated with some example embodiments of the invention. Initially, an MPIO may be used to define (1) an application-specific storage group that embraces one or more devices of a storage array. More generally however, the SG can be defined at any time, whether by an MPIO and/or other entity. As part of normal operations, a host application residing at a client may initiate (2) a process that involves one or more devices of the SG. To illustrate, an instance of Oracle® may initiate a process, such as DB Process, which is a database writer (dbwriter) process. Thus, this example process may involve reading and/or writing to a database device at the storage array.

As part of the process initiated by the host application, the host application may issue (2) one or more IOs to device(s) at the storage array, such as the aforementioned database device for example. These IOs may be issued from the host application to the SG device(s) by way of an MPIO layer at the host. The MPIO layer, in turn, can detect (3) the name of the process initiated by the host application by reading the process name. In some instances, the host application may add the name to the process. For example, an Oracle® instance that is associated with the marketing department of an enterprise may have a process name, such as 'dbwriter_marketing,' that identifies the particular process, as well as an association of that process with a particular department. As another example, an Oracle® instance that is associated with the sales department of an enterprise may have a process name such as 'dbwriter_sales.' These process names are presented only by way of example and, more generally, a process can be given any suitable name.

Because the MPIO layer is aware of the process name, the MPIO layer can tag (4) the associated IOs with that process name. As shown, the MPIO layer can access a table at the host device that includes tags for all of the process names associated with a particular application. For example, the MPIO layer can add the appropriate tag into the Small Computer System Interface (SCSI) command that was initiated from the process.

In connection with the foregoing, the storage array is able to examine the IO tags to determine which SG is receiving those IOs. As noted elsewhere herein, the tags can each take the form of a number, such as a number 1 through 15. By way of illustration, if an SG device is only receiving IOs with one tag, such as a tag associated with dbwriter for example, the storage array knows that the SG device is being used by Oracle® database processes. In more detail, if an SG is only receiving IOs from processes associated with a "Marketing" Oracle® DB, then the array knows that the SG is 'Oracle Marketing.' In some embodiments, the array receives a per-device report, such as a VU CMD, that indicates the name(s) of the application(s) using that device.

It should be noted that while the aforementioned examples refer to the use of a process name as a basis for assigning tags to one or more IOs, any other type of process-related metadata can alternatively be used by the MPIO layer as a basis for recognizing the process, and then assigning corresponding tags to the IOs. For example, any information or metadata that can be derived from the operating system (OS) on that process may alternatively be used. To illustrate, a process may have directory location information, version number, and other key-value information as part of its runtime environment. Any or all of this information can be used in the same way as the process name. That is, the process "name" is the full name including directory/path information. Versions may be given as part of the directory name. Other metadata may be returned with standard OS calls.

At some point prior to replication (5), a user defines correlations between the host application process and certain behaviors, or replication processes. Such replication processes may include snapshots, backups, and other processes. As noted herein, such correlations may be captured in a table that resides at the host device and/or at the storage array. One example of such a table is discussed herein in connection with FIG. 2.

As a default, a user may initially target all devices in an SG for some type of replication functionality, whether by a local replication process at a storage array or a remote replication process at a host device. Other default device targeting arrangements can also be employed however. The particular default of targeting all devices of an SG may serve as a fail-safe and reflect a judgment that in the absence of other directives, it is preferable to replicate all devices, even if some of those may not need replication.

The replication process may be initiated (5) by a replication application, such as Dell-EMC RecoverPoint for example, that resides at the host device. The resulting replication dataset, whether a snapshot, clone, or other type of replication, may reside at the host device, at the storage array, or at both. As part of the replication process (5), the storage array reads the table of the process names, tag(s) associated with those process names, and the replication behaviors to be implemented for the particular process. Using this information, the storage array then replicates one or more SG devices according to the parameters in the table. This replication by the storage array may override an initial default approach that requires replication of all the SG devices.

E. Aspects of Some Example Methods

Figure 5:
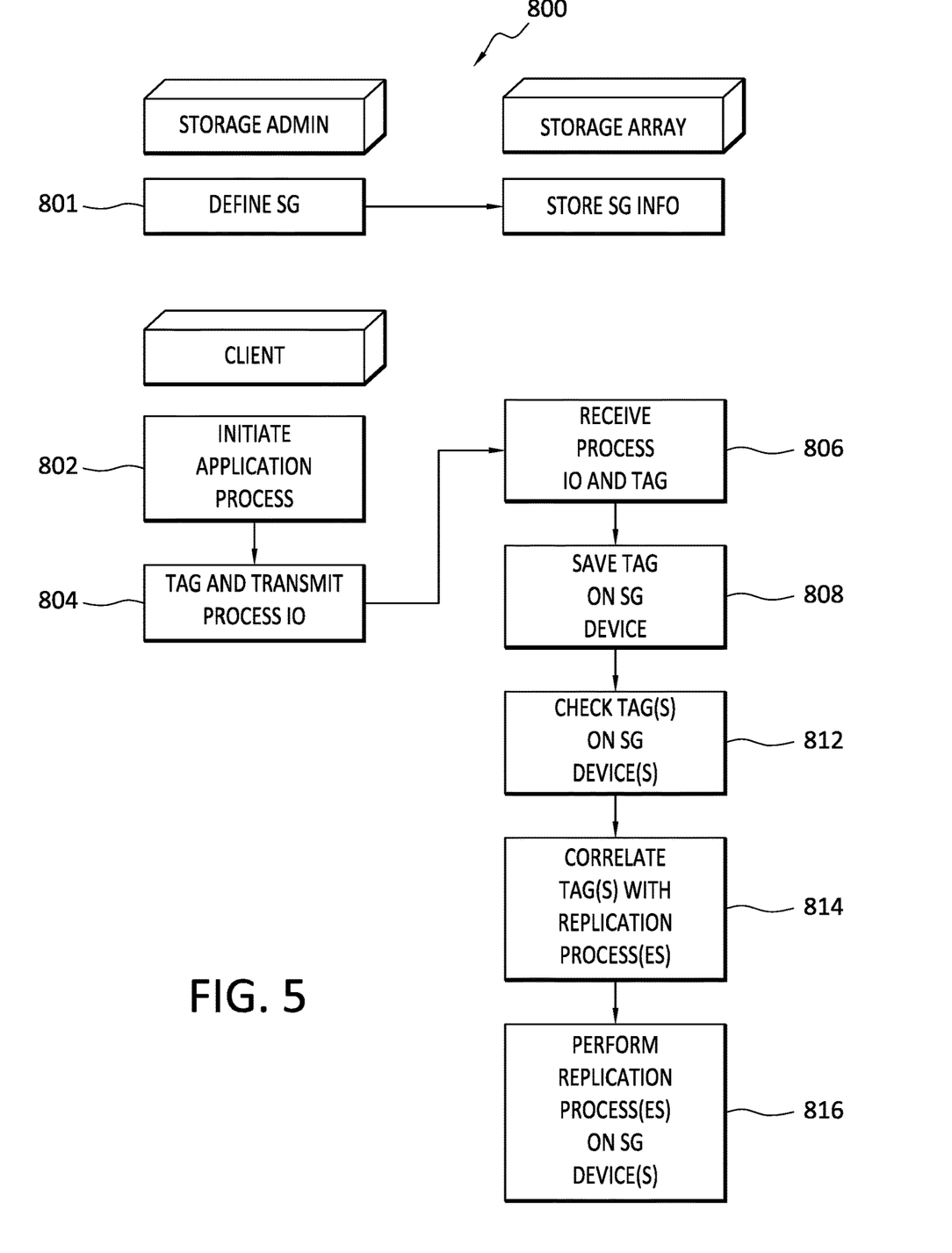
FIG. 5 discloses aspects of some example methods.

With continued attention to FIG. 4 and the associated discussion, and directing attention now to FIG. 5 as well, details are provided concerning methods for implementing replication processes, such as application-specific replication processes for example, based on device usage, where one example of such a method is denoted generally at 800. The method 800 may be performed in whole, or in part, by a replication application, such as the example replication applications 202c, 204c, and 206c. Some or all of the method 800 may be performed by a client MPIO layer. As well, the method 800 can be cooperatively implemented, for example, by a replication application and a storage array, such as the storage array 402 and the storage array 404. Consistent with the foregoing, the functional allocation indicated in FIG. 5 is not intended to limit the scope of the invention in any way. Rather, the functions disclosed in, and implicated by, FIG. 5 may be allocated among various entities in ways other than those illustrated.

Turning now to the example method 800, a storage group (SG) may initially be defined 801, such as by a storage administrator for example using a GUI SE or CLI commands. The SG can be defined in other ways as well. The storage administrator may operate from a storage array, such as the storage array 402 and/or storage array 404, or the storage administrator may operate from a control host (not shown). In order to ensure security of the storage array, the SG is not defined by a production host or production server.

A replication application, such as Dell-EMC RecoverPoint for example, may be used to define the contents of the SG, and assign a name and other information to the SG. Additionally, or alternatively, a host application such as Oracle® for example, may define an SG. In general, and as disclosed in more detail elsewhere herein, the SG may comprise, or consist of, one or more devices located at a storage array that are desired to be protected by some type of replication process. In at least some embodiments, the SG is application-specific, that is, the particular group of devices embraced by the SG are all employed in connection with processes performed by a particular host application. It should be noted that the SG need not necessarily be defined 801 prior to implementation of all the other processes of FIG. 5. Rather, the SG can be defined 801 at any other time that is not inconsistent with performance of those processes.

At 802, a host application initiates a process, which can be any process that involves one or more devices of the storage array and, particularly, the data on those devices. As such, example processes include, but are not limited to, read and write processes. The process initiated 802 by the host application can be performed in connection with the creation of new and/or modified data, by the host application, that is desired to be protected.

In connection with the process initiated 802 by the host application, the host application may issue a variety of IOs 804 to one or more devices of the storage array, and these IOs are tagged 804, such as by an MPIO layer of a host device. More specifically, the MPIO layer can consult a table to identify the tag of the process that originated the IO, and the MPIO layer then tags the IOs from the host application with that process tag. In this way, the IOs are each associated with the particular process that originated them and, as discussed below, the use of the process tag can be extended to also associate one or more particular devices of the storage array with that process, that is, by tagging the storage array devices to which the IOs are directed. It should be noted that if the process that originated an IO does not appear in the table, then the IO may not be tagged by the MPIO layer. The MPIO layer can then transmit the IO and associated tag 804 to the storage array.

The storage array receives 806 the IO and saves the associated tag 808 on the device to which the IO is directed. The storage array may save up to X tags per device, if the particular device is used by multiple processes. The tags may be stored in a table located at the array, one example of which is disclosed in FIG. 2. As also disclosed in FIG. 2, the table may correlate one or more replication processes to one or more of the devices in a particular SG.

If only a single process is using that device, the device will only have one tag. While the devices in the SG may have different tags, the devices of the SG are all associated with the same application, although the devices may also belong to one or more other SGs as well. Because the SG may be application-specific, the table may correspondingly be specific to the same application, although that is not required. The contents of the table that resides at the storage array may be identical to the contents of the table at the host device.

Subsequently, a user or other entity, such as a backup application operating on a backup server for example, may initiate a replication of the SG. As another example, the SG protection process may be initiated by a customer script running on a management server. The replication may be, for example, local and/or remote replication, or another data protection process. The storage array then checks the table 812 to see what tags are on each of the devices of the SG that has been targeted for replication, and the storage array then correlates 814 the tag(s) with one or more replication processes, or other data protection processes.

If, for example, the table indicates that the local replication behavior associated with a tag is "Don't local replicate," then the storage array will skip local-replicating that device. More generally, the storage array will perform 816 whatever processes, sometimes referred to herein as behaviors, are indicated by the table with respect to the devices of the SG that is to be replicated. As noted herein, examples of such behaviors include, but are not limited to: local-replicate (either yes, or no—Y/N); remote replicate (either yes, or no—Y/N); backup (either yes, or no—Y/N); and, allow delete (either yes, or no—Y/N). More generally, any other behaviors, or replication-related processes, can be defined and implemented for one or more of the devices in an SG.

A circumstance can occur where a device has multiple tags, each associated with the same process, assigned to it by the storage array. If the tags all specify the same behavior, then the storage array will simply perform the indicated process. On the other hand however, the tags may not always specify the same behavior. In the case of such a conflict, a default course of action can be designated to be performed by the storage array. For example, if one tag indicates that a device is not to be replicated, while another tag on the same device indicates that device should be replicated, then the storage array may default to the safer course of action, that is, replication of the device.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    receiving an input/output (IO) associated with a process initiated by an application, and the IO is identified by a tag that corresponds to the process;
    saving the tag on a device that is an element of a storage group (SG) that is specific to the application;
    correlating the tag with a data protection process that is associated with the application;
    receiving a request to protect an SG; and
    performing a data protection process on the device.

2. The method as recited in claim 1, wherein the tag, data protection process, and device, are all associated with each other by way of a table that resides at a storage array.

3. The method as recited in claim 1, wherein the method is performed at a storage array configured for communication with a host device that hosts the application.

4. The method as recited in claim 1, wherein the data protection process is either a remote replication process, or a local replication process.

5. The method as recited in claim 1, wherein the IO is directed to the device.

6. The method as recited in claim 1, wherein performing the data protection process on the device comprises:
    looking at the tag on the device; and
    cross-referencing the tag to the data protection process.

7. The method as recited in claim 1, wherein the request to protect an SG is application-specific and the request to protect the SG is received from a data protection application of a host device.

8. The method as recited in claim 1, wherein the request to protect the SG comprises a request to protect all devices in the SG.

9. The method as recited in claim 1, wherein the IO and the tag are received from an multi-path input/output (MPIO) layer of a host device.

10. The method as recited in claim 1, wherein the method further comprises, in response to receipt of the request to protect the SG, performing another data protection process on another device in the SG.

11. The method as recited in claim 1, wherein when the device includes two tags that correspond to different respective data protection processes, the method further comprises performing one of the different respective data protection processes according to a default.

12. A non-transitory storage medium having stored therein computer-executable instructions which, when executed by one or more hardware processors, perform the following operations:
    receiving an IO associated with a process initiated by an application, and the IO is identified by a tag that corresponds to the process;
    saving the tag on a device that is an element of a storage group (SG) that is specific to the application;
    correlating the tag with a data protection process that is associated with the application;
    receiving a request to protect an SG; and
    performing a data protection process on the device.

13. The non-transitory storage medium as recited in claim 12, wherein the tag, data protection process, and device, are all associated with each other by way of a table that resides at a storage array.

14. The non-transitory storage medium as recited in claim 12, wherein the data protection process is either a remote replication process, or a local replication process.

15. The non-transitory storage medium as recited in claim 12, wherein the IO is directed to the device.

16. The non-transitory storage medium as recited in claim 12, wherein performing the data protection process on the device comprises the following operations:
   looking at the tag on the device; and
   cross-referencing the tag to the data protection process.

17. The non-transitory storage medium as recited in claim 12, wherein the request to protect an SG is application-specific and the request to protect the SG is received from a data protection application of a host device.

18. The non-transitory storage medium as recited in claim 12, wherein the request to protect the SG comprises a request to protect all devices in the SG.

19. The non-transitory storage medium as recited in claim 12, wherein the IO and the tag are received from an MPIO layer of a host device.

20. The non-transitory storage medium as recited in claim 12, wherein when the device includes two tags that correspond to different respective data protection processes, the operations further comprises performing one of the different respective data protection processes according to a default.

* * * * *